US005819345A

United States Patent [19]

Basgall

[11] Patent Number: 5,819,345

[45] Date of Patent: Oct. 13, 1998

[54] ACTUATOR DEVICE

[76] Inventor: Dale G. Basgall, 3124 B Iolani St., Pukalani, Hi. 96768

[21] Appl. No.: 883,018

[22] Filed: Jun. 26, 1997

Related U.S. Application Data

[62] Division of Ser. No. 599,797, Feb. 12, 1996, Pat. No. 5,669,090.

[60] Provisional application No. 60/009,179 Dec. 22, 1995.

[51] Int. Cl.[6] .............................. A61G 7/018; F16H 1/20

[52] U.S. Cl. ................................ 5/616; 254/98; 74/89.15; 74/424.8 A

[58] Field of Search ................................ 5/613, 616, 617; 254/98; 74/89.15, 424.8 A

[56] References Cited

U.S. PATENT DOCUMENTS

| | | | |
|---|---|---|---|
| 1,941,378 | 12/1933 | Andrew | 254/98 |
| 3,174,161 | 3/1965 | Black | 5/616 |
| 5,461,935 | 10/1995 | Hill | 74/89.15 X |
| 5,673,593 | 10/1997 | Lafferty | 74/89.15 X |
| 5,704,249 | 1/1998 | Krauska | 74/89.15 X |

OTHER PUBLICATIONS

NOA Bed—2 pages—Parts List.
Modular Plus Bed—2 pages—Brochure.
Ultra Rehab Bed—2 pages—Brochure.

*Primary Examiner*—Michael F. Trettel
*Attorney, Agent, or Firm*—Flanagan & Flanagan; John R. Flanagan; John K. Flanagan

[57] ABSTRACT

A rehabilitation bed for accommodating an obese person includes a main frame with separate forward and rearward frame structures connected together end-to-end and constituting mirror images of one another, forward and rearward deck structures for supporting a mattress thereon being mounted to and resting upon the forward and rearward frame structures, head and foot actuator mechanisms pivotally mounted to the forward and rearward frame structures and pivotally coupled to the forward and rearward deck structures, separate forward and rearward carriages underlying and supporting the respective forward and rearward frame structures of the main frame, front and rear actuator mechanisms respective pivotally coupled to a front linkage assembly of the forward carriage and a rear linkage assembly of the rear carriage and operable between extended and retracted conditions to pivotally move the front and rear linkage assemblies reciprocally along arcuate paths being mirror images of one another to cause the forward and rear frame structures to raise and lower relative to the forward and rearward carriages and the floor without undergoing any substantial horizontal movement relative the floor, and head and foot drive modules having electric bi-directional motors coupled to the respective head and foot actuator mechanisms for pivotally moving the deck structures independent of one another and relative to the main frame to transform the bed between multiple positions.

3 Claims, 5 Drawing Sheets

ACTUATOR DEVICE

This is a division of Ser. No. 08/599,797 filed Feb. 12, 1996 now U.S. Pat. No. 5,669,090 and claims Provisional Appl. 60/009,179, filed Dec. 22, 1995.

BACKGROUND OF THE INVENTION

1. Field of the Invention

The present invention generally relates to rehabilitation beds and, more particularly, is concerned with a rehabilitation bed that is transformable to multiple positions for accommodating the needs of an obese person.

2. Description of the Prior Art

Many persons that are severely overweight, commonly referred to as being obese, are effectively handicapped in the sense that their mobility is very limited in most cases. Some of these obese people cannot move under their own power thus rendering them helpless and lacking in mobility. There are some obese people who must remain stationary in whatever position they are placed due to their inability to even move under their own strength. Such persons in many cases are restricted to lying on a bed for extended periods of time counted in months and even years. These individuals require very specialized assistance from numerous caregivers using various types of medical equipment.

Without such assistance, these obese individuals will likely develop a variety of medical problems. For example, skin ulcers and large open sources will develop due to the pressure applied to the same areas of their bodies over long periods of time. Also, due to their inability to move, these obese persons will experience a lack of blood circulation through the extremeties of their bodies which may lead to the amputation of one or both legs thus furthering their handicapped condition.

Due to the continued growth in the number of individuals suffering from severe obesity in the United States, their special needs have been receiving more attention in the medical community. This has resulted in various attempts to develop rehabilitation beds which will serve the special needs of these individuals. Such beds are commonly capable of independently elevating and lowering head and foot portions of the bed mattress relative to the bed frame in order to place the upper body of the obese individual in a sitting position and/or to bend the lower body of the individual at the knees. Also, the frames of some beds are capable of being raised or lowered relative to the floor. The transformation of these beds between different positions is not only a benefit to the individuals who are confined on the beds but also make it easier and safer for caregivers to move and turn these individual on the bed.

Rehabilitation beds must be capable of supporting obese individuals whose weight may exceed 600 pounds. Furthermore, such beds must provide the required load support both under static conditions when the various components of the bed are stationary and support the person at a given position and dynamic conditions when the various components are moving between the various positions and the weight of the person is also shifting. All currently available rehabilitation beds have designs and constructions which fail to maintain stability under both static and dynamic conditions in a reliable and durable manner.

Consequently, a need exists for improvements in the design and construction of a rehabilitation bed so that the bed will be reliable and durable under both static and dynamic load conditions.

SUMMARY OF THE INVENTION

The present invention provides a rehabilitation bed designed and constructed to satisfy the aforementioned needs. The rehabilitation bed of the present invention has a main frame with forward and rearward frame structures being constructed as mirror images of one another and releasably attached end-to-end, allowing easy of assembly and disassembly thereof, and a mattress support deck with forward and rearward deck structures mounted on the respective forward and rearward frame structures of the main frame. The bed also has a mobile undercarriage with forward and reaward carriages supporting the forward and rearward frame structures of the main frame and also being arranged as mirror images of one another and movable along arcuate paths being mirror images of one another so as to cause raising and lowering of the main frame without undergoing any substantial horizontal movement relative to the floor surface supporting the bed. The bed further has drive motors mounted at opposite ends of the bed connected to actuators for operating the forward deck structure and forward carriage separate from one another and from the actuators and drive motors which operate the rearward deck structure and rearward carriage. Such components and their arrangement provides the bed with a more stable, reliable and durable construction than has been provided heretofore. Furthermore, the bed is easily and readily operated by only a single caretaker to transform the components of the bed, while under severe load conditions due to the weight of an obese person supported thereon, between different multiple positions in order to accommodate the special needs of the obese person.

Accordingly, the present invention is directed to a rehabilitation bed transformable to multiple positions for accommodating an obese person. The rehabilitation bed comprises: (a) a main frame with separate forward and rearward frame structures constructed and provided as mirror images of one another; (b) forward and rearward mattress deck structures pivotally mounted to and resting upon the forward and rearward frame structures; (c) head and foot actuator mechanisms respectively pivotally mounted to the forward and rearward frame structures and pivotally coupled to the forward and rearward deck structures; (d) separate forward and rearward carriages underlying and supporting respectively the forward and rearward frame structure; (e) front and rear actuator mechanisms respectively pivotally coupled to front and rear linkage assemblies of the forward and rearward carriages and operable between extended and retracted conditions to pivotally move the linkage assemblies reciprocally along arcuate paths provided as mirror images of one another to cause the forward and rear frame structures to lower and raise relative to a floor without causing horizontal movement of the forward and rearward carriages across the floor; and (f) head and foot drive modules having respective pairs of electric bi-directional motors coupled to the respective actuator mechanisms for pivotally moving the support deck structures and the forward and rearward carriages independent of one another and relative to the main frame to transform the bed between multiple positions.

The present invention also is directed to an actuator device for applying push and pull forces to perform work. The actuator device comprises: (a) an elongated hollow tube; (b) an elongated externally threaded screw shaft extending at least partially through the elongated hollow tube to undergo rotation relative thereto and thereby extension from and retraction into the tube depending upon the direction of rotation of the screw shaft; (c) an annular collar fitted into and positioned adjacent to one end of the hollow tube, the annular collar having a central bore internally threaded so as to receive and threadably interfit with the externally threaded screw shaft extending into the tube; (d) a lock arrangement comprising a plurality of recesses defined in the exterior surface of the annular collar, a series of spaced slots defined through the tube in alignment with the recesses and a plurality of lock segments disposed through the slots and into the recesses, the lock segments having widths which cause them to protruding slightly from the recesses and through the slots; and (e) a sleeve inserted over the tube and surrounding the lock arrangement so as to interfit therewith in a an engaged relationship which holds the annular collar against undergoing rotationa with the screw shaft relative to the tube such that the tube linearly translate so as to extend from or retract over the screw shaft depending upon direction of rotation of the screw shaft. The sleeve is held in place by snap rings removably engaged with the tube at opposite ends of the sleeve.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
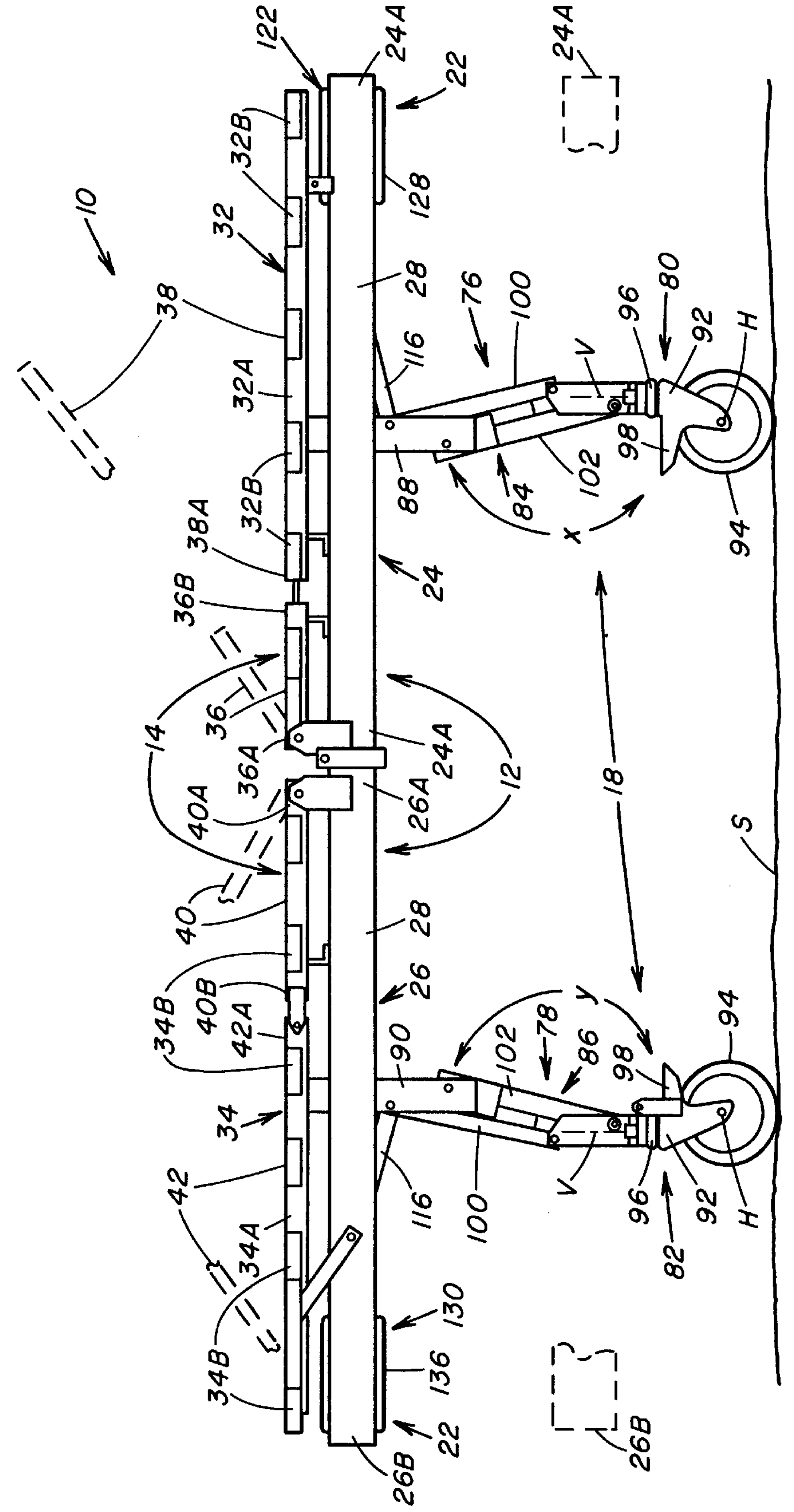
FIG. 1 is an assembled side elevational view of a rehabilitation bed of the present invention without the mattress and foot board, head board and side rail assemblies.

Referring to the drawings, and particularly to FIGS. 1–6, there is illustrated a rehabilitation bed of the present invention, generally designated 10, having components transformable to different multiple positions for accommodating the needs of an obese person. The bed 10 includes a main frame 12, a mattress support deck 14 mounted upon the main frame 12, and a first actuating arrangement 16 for causing pivotal movement of parts of the support deck 14 to transform a mattress M resting thereon to various different multiple positions. Also, the bed 10 includes a mobile undercarriage 18 movably as well as stationarily supporting the main frame 12 and a second actuating arrangement 20 for causing movement of the main frame 12 relative to the undercarriage 18 to raise and lower the mattress relative to a floor surface S supporting the bed 10. Further, the bed 10 also includes drive means 22 for supplying the motive power to the first and second actuating arrangements 16, 20 that is necessary to move the support deck 14 and mobile undercarriage 18 independent of one another and relative to the main frame 12 to transform the bed 10 into the different desired multiple positions.

Referring again to FIGS. 1–6, the main frame 12 of the bed 10 includes a forward frame structure 24 and a rearward frame structure 26. The frame structures 24, 26 have respective outer ends 24A, 26A located remote from one another and respective inner ends 24B, 26B located adjacent to one another. As seen in FIG. 5, each of the forward and rearward frame structures 24, 26 is formed by a pair of longitudinal side members 28 and a pair of cross members 30. The side members 28 are laterally spaced apart from one another. The cross members 30 are longitudinally spaced apart from one another and extend between and are rigidly attached at opposite ends to the longitudinal side members 28 near the respective outer and inner ends 24A, 26A and 24B, 26B of the forward and rearward frame structures 24, 26 which are defined by the opposite ends of the longitudinal side members 28 thereof. Thus, the forward frame structure 24 and rearward frame structure 26 are constructed so as to be substantially identical to one another and by being arranged and secured to one another by brackets located at their adjacent inner ends 24A, 26A are provided as mirror images of one another and extend along a common plane.

Referring to FIGS. 1–5, the mattress support deck 14 of the bed 10 is disposed above the main frame 12 and includes a forward deck structure 32 and a rearward deck structure 34 adapted to rest upon the respective forward frame structure 24 and rearward frame structure 26 of the main frame 12. The rearward and forward deck structures 32, 34 are formed by pluralities of rigidly connected lengthwise and widthwise extending flat boards 32A, 32B and 34A, 34B.

The forward deck structure 32 of the support deck 14 has a rear lumbar section 36 and a front head and shoulder section 38. The rear lumbar section 36 has a planar configuration and is pivotally mounted at one end 36A to the forward frame structure 24 of the main frame 12 adjacent to the inner end 24A of the forward frame structure 24 to undergo movement between substantially horizontal and inclined positions relative to the forward frame structure 24. The front head and shoulder section 38 has a planar configuration and is pivotally connected at one end 38A to an opposite end 36B of the rear lumbar section 36 to undergo movement between substantially horizontal and inclined positions relative to the forward frame structure 24.

The rearward deck structure 34 of the support deck 14 has a front buttocks section 40 and a rear foot section 42. The front buttocks section 40 has a planar configuration and is pivotally mounted at one end 40A to the rearward frame structure 26 of the main frame 12 adjacent to the inner end 26A of the rearward frame structure 26 to undergo movement between substantially horizontal and inclined positions relative to the rearward frame structure 26. The rear foot section 42 has a planar configuration and is pivotally connected at one end 42A to an opposite end 40B of the front buttocks section 40 to undergo movement between substantially horizontal and inclined positions relative to the rearward frame structure 26. The inclined positions of the front buttocks section 40 are the reverse of the inclined positions of the rear foot section 42.

Figure 5:
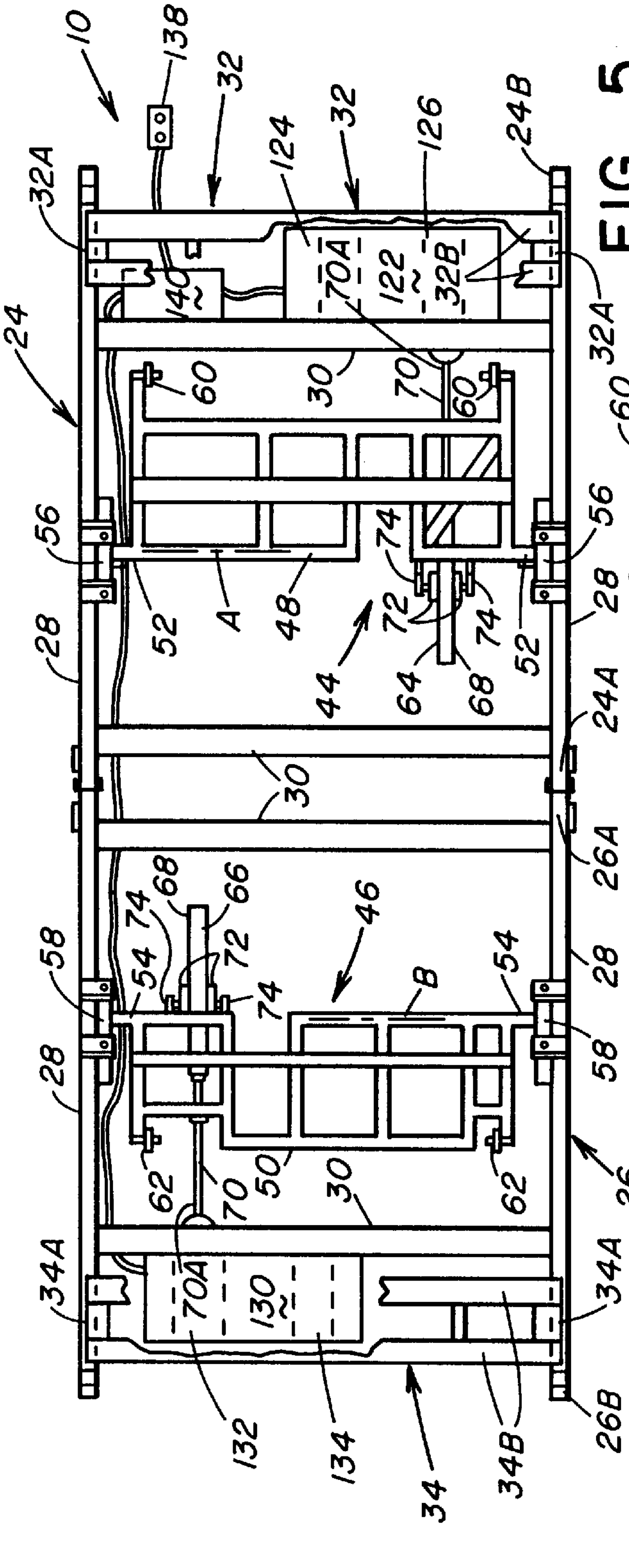
FIG. 5 is an assembled top plan view of the bed showing an actuating arrangement for pivoting forward and rearward deck structures of the support deck which are fragmentarily shown.
Figure 6:
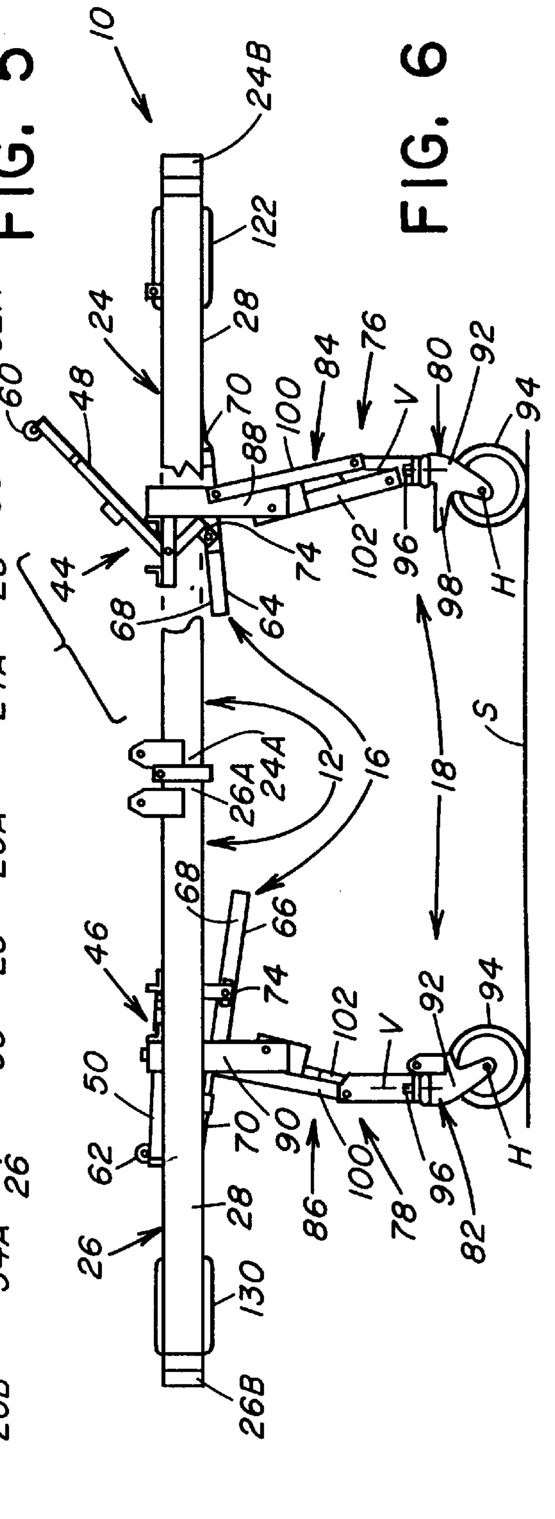
FIG. 6 is an enlarged side elevational view of the bed of FIG. 5 with portions broken away.
Figure 7:
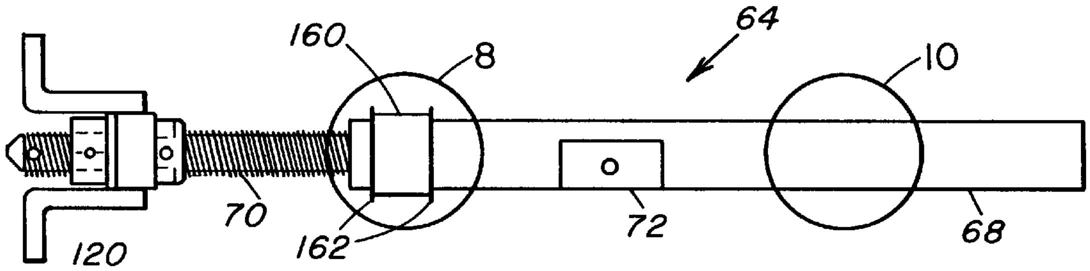
FIG. 7 is a side elevational view of one of the actuator devices used by the bed.
Figure 9:
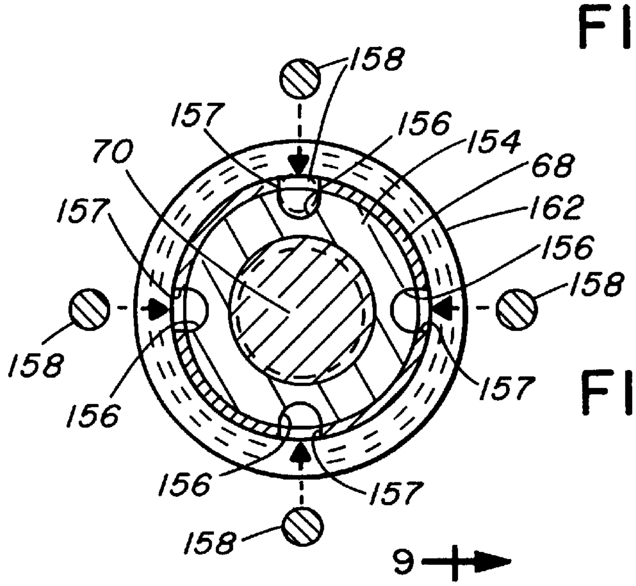
FIG. 9 is a cross-sectional view taken along line 9—9 of FIG. 8.
Figure 8:
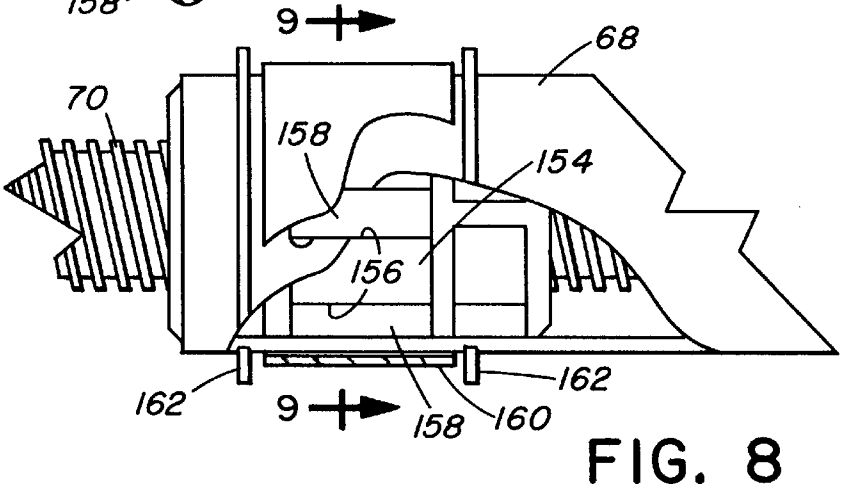
FIG. 8 is an enlarged fragmentary detailed view of the portion of the actuator device within circle 8 of FIG. 7.

Referring to FIGS. 5 and 6, the first actuating arrangement 16 of the bed 10 is operable to pivotally move the parts of the support deck 14 to transform the mattress M resting thereon to the various different multiple positions. The first actuating arrangement 16 includes a head actuator mechanism 44 and a foot actuator mechanism 46. The head and foot actuator mechanisms 44, 46 include respective head and foot lift platforms 48, 50 in the form of rigid frameworks which span across the main frame 12 between the opposite longitudinal side members 28 of the forward and rearward frame structures 24, 26 thereof. The head and foot lift platforms 48, 50 have respective pairs of axially aligned stub shafts 52, 54 lying on respective common axes A, B and projecting outwardly from opposite lateral ends of the lift platforms 48, 50. The stub shafts 52, 54 are rotatably mounted by corresponding pairs of bearings 56, 58 attached to the opposite longitudinal side members 28 of the forward and rearward frame structures 24, 26. The head and foot lift platforms 48, 50 also have respective pairs of rollers 60, 62 rotatably mounted to the corners of respective head and foot ends of the lift platforms 48, 50, as seen in FIG. 5. These pairs of rollers 60, 62 respectively rollably engage the undersides of the front head and shoulder section 38 of the forward deck structure 34 and the undersides of the rear foot section 42 of the rearward deck structure 34 and in such manner pivotally couple the respective head and foot actuator mechanisms 44, 46 to the front head and shoulder section 38 and rear foot section 42 of the forward and rearward deck structures 32, 34 of the support deck 14.

The head and foot actuator mechanisms 44, 46 further include respective elongated head and foot actuator devices 64, 66 which are identical to one another and pivotally mounted to the respective head and foot lift platforms 48, 50. While they will described in greater detail later with reference to FIGS. 7–10, suffice it to say at this point that each of the actuator device 64, 66 has an elongated hollow tube 68 and an elongated threaded screw shaft 70 rotatably and threadably mounted through the elongated hollow tube 68 for undergoing rotation relative thereto and thereby extension from and retraction into the tube 68, depending upon the direction of rotation of the screw shaft 70. Each of the tubes 68 of the actuator devices 64, 66 has a pair of opposite side lugs 72 fixed thereon by which they are pivotally mounted between pairs of brackets 74 attached on the respective head and foot lift platforms 48, 50 and disposed in offset relation to the rotational axes A, B of the lift platforms 48, 50. As will be described below, exposed outer ends 70A of the screw shafts 70 of the head and foot actuator devices 64, 66 are coupled to drive components of the control means 22 of the bed 10 which are operable to drive rotation of the screw shafts 70 in desired directions so as to selectively retract or extend the screw shafts 70 from or into the tubes 68 of the actuator devices 64, 66 and thereby cause corresponding raising or lowering of the lift platforms 48, 50 and forward and rearward deck sections 32, 34 therewith relative to the main frame 12 of the bed 10.

Figure 2:
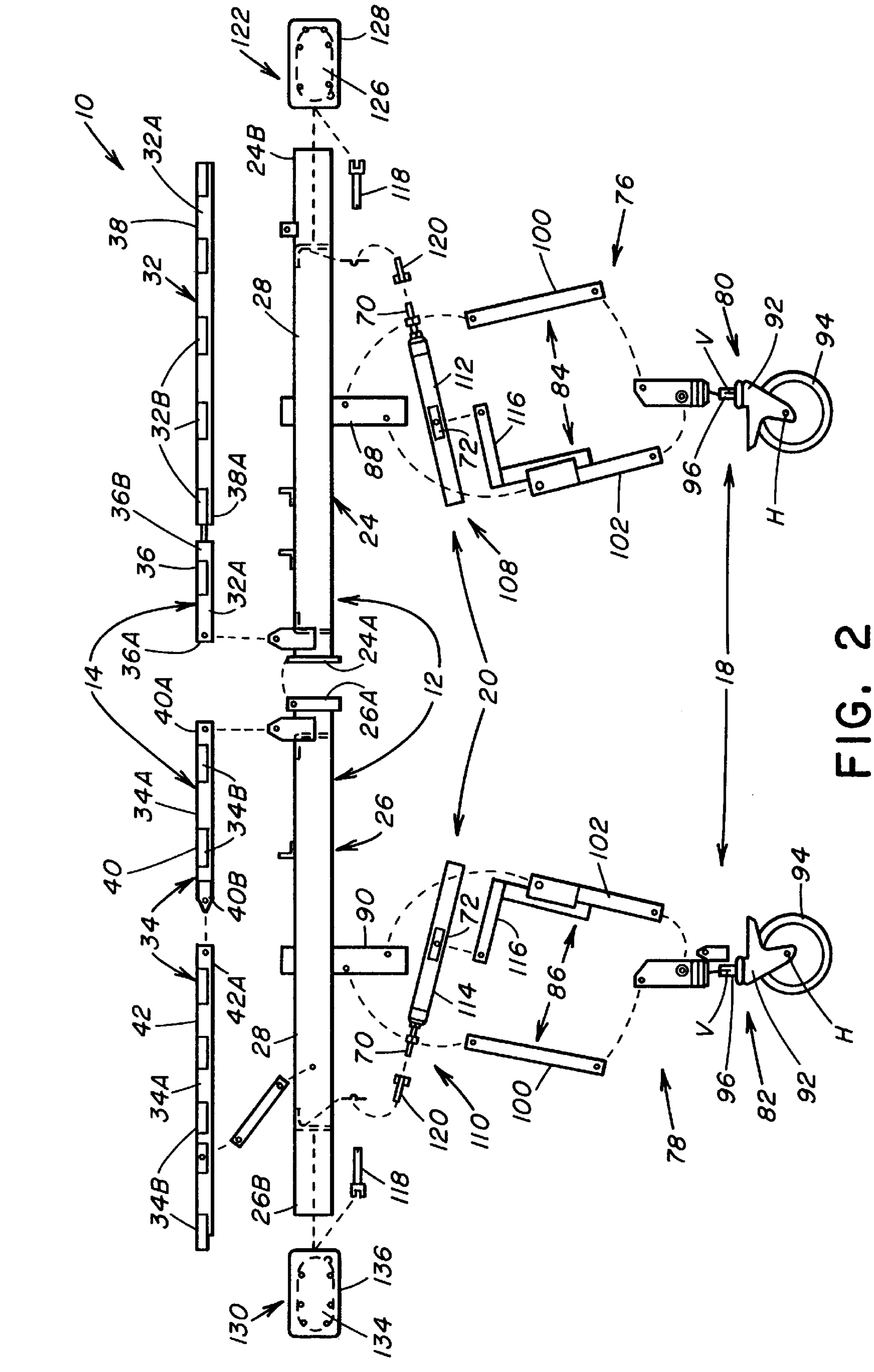
FIG. 2 is an exploded side elevational view of the bed of FIG. 1.
Figure 3:
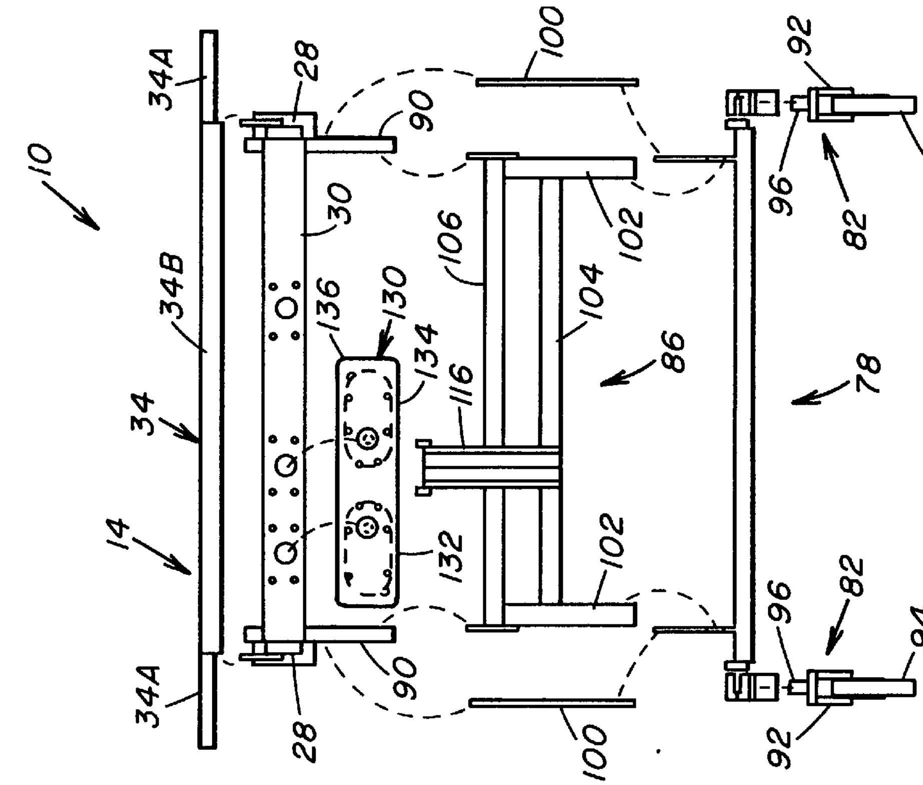
FIG. 3 is an exploded foot end elevational view of the bed of FIG. 1.

Referring to FIGS. 1–4 and 6, the mobile undercarriage 18 of the bed 10 for both stationarily and movably supporting the main frame 12 basically includes a forward carriage 76 and a rearward carriage 78 which repectively underlie and support the forward frame structure 24 and the rearward frame structure 26 of the main frame 12. As can be clearly seen in FIGS. 1 and 2, the separate forward and rearward carriages 76, 78 are constructed and provided substantially as mirror images of one another. The forward carriage 76 has a pair of front wheel assemblies 80, while the rearward carriage 78 has a pair of rear wheel assemblies 82. Also, the forward carriage 76 has a front linkage assembly 84 extending between and interconnecting the pair of front wheel assemblies 80, while the rearward carriage 78 has a rear linkage assembly 86 extending between and pivotally interconnecting the pair of rear wheel assemblies 82. Further, the front linkage assembly 84 is pivotally mounted to the main frame 12 by a pair of front vertical support posts 88 fixed midway along the longitudinal side members 28 of the respective forward frame structure 24 of the main frame 12, while the rear linkage assembly 86 is pivotally mounted to the main frame 12 by a pair of rear vertical support posts 90 fixed midway along the longitudinal side members 28 of the respective rearward frame structures 26 of the main frame 12. The respective pairs of front and rear wheel assemblies 80, 82 are longitudinally aligned and spaced apart, as seen in FIGS. 1, 2 and 6, while the wheel assemblies 80, 82 in each of the front and rear pairs thereof are laterally aligned and spaced apart, as seen in FIG. 3.

More particularly, referring to FIGS. 2 and 3, each wheel assembly 80, 82 includes a caster housing 92, a wheel 94 mounted to the caster housing 92 to undergo rotation about a horizontal axis H, and a caster axle 96 mounting the caster housing 92 to undergo rotation about a vertical axis V extending perpendicular to the horizontal rotational axis H of the wheel 94. Also, each wheel assembly 80, 82 has a brake mechanism 98 of well-known construction which can be releasably engaged to lock the wheel 94 against rotation and thus hold the carriages 76, 78 and thus the bed 10 in a stationary position.

Each of the front and rear linkage assemblies 84, 86 includes a pair of substantially parallel disposed outer and inner links 100, 102 which respectively extend between and pivotally interconnect the caster axles 96 with the front and rear vertical support posts 88, 90. Also, each of the front and rear linkage assemblies 84, 86 includes an elongated lower tie rod 104 extending between and fixedly connected to the caster axles 96 and a pair of elongated upper tie rods 106 extending between and fixedly connected to the inner links 102.

Referring now to FIG. 2, the second actuating arrangement 20 of the bed 10 is operable to pivotally move the links 102, 104 of the front and rear linkage assemblies 84, 86 between generally horizontal and vertical orientations in order to lower and raise the main frame 12 and thus the mattress M to various different levels above the floor surface S supporting the bed 10. The second actuating arrangement 20 includes a front actuator mechanism 108 and a rear actuator mechanism 110. The front and rear actuator mechanisms 108, 110 further include respective elongated front and rear actuator devices 112, 114 which are identical to one another and identical to the head and foot actuator devices 64, 66 as briefly described above and in detail hereinafter. Each of the tubes 68 of the actuator devices 112, 114 are pivotally mounted at the pair of opposite side lugs 72 to a crank arm 116 attached at a right angle to the inner link 102 of each of the front and rear linkage assemblies 84, 86.

The front and rear actuator mechanisms 108, 110 also include drive shafts 118 and collars 120 by which the exposed outer ends 70A of the screw shafts 70 of the front and rear actuator devices 112, 114 are coupled to drive components of the drive means 22 of the bed 10. Such components of the drive means 22 are operable to rotatably drive the screw shafts 70 in desired directions so as to selectively retract or extend the screw shafts 70 from or into the tubes 68 of the front and rear actuator devices 112, 114 and thereby cause corresponding raising or lowering of the main frame 12 and mattress M relative to the floor surface S and forward and rearward carriages 76, 78. Because of the mirror image orientation of the forward and rearward carriages 76, 78, the front and rear linkage assemblies 84, 86 move along first and second arcuate paths X, Y which are also provided in substantially mirror image relationship to one another. As the screw shafts 70 of the front and rear actuator devices 112, 114 rotate and move between the retracted and extended conditions, the front and rear linkage assemblies 84, 86 respectively swing reciprocally along the first and second arcuate paths X, Y causing the corresponding forward and rearward frame structures 24, 26 of the main frame 12 to raise and lower relative to the forward and rearward carriages 76, 78 and floor surface S, but because of the mirror imaged or opposed relationship of the paths to one another, without causing the main frame 12 to undergo any substantial horizontal movement relative to the floor surface S.

Referring to FIGS. 1–6, the drive means 22 of the bed 10 basically includes a head drive module 122 having a pair of electric bi-directional drive motors 124, 126 housed in a head enclosure 128, and a foot drive module 130 having a pair of electric bi-directional motors, 132, 134 housed in a foot enclosure 136. The head and foot enclosures 128, 136 respectively house and align the pairs of the drive motors 124, 126 and 132, 134 so that their output shafts can be drivingly coupled with the outer ends 70A of the screw shafts 70 of the respective head and front actuator devices 64, 112 and foot and rear actuator devices 66, 114 of the respective first and second actuating arrangements 16, 20. The head and foot enclosures 128, 136 are attached to and supported by the respective cross members 30 of the forward and rearward frame structures 24, 26 at the head and foot ends of the main frame 12. The bi-directional drive motors 124, 126 and 132, 134 can be operated by a caretaker by pressing suitable hand buttons of a handheld control module 138 electrically connected to suitable electronic controls 140 supported on the head end of the main frame 12. The electronic controls 140, which are within the purview of one of ordinary skill in the art to provide, operate the drive motors in the desired direction so as to transmit rotary motion to and thereby cause rotation of the respective screw shafts 70 of the selected actuator devices 64, 66, 112, 114, causing the screw shafts 70 to either extend or retract and to pivotally move the forward and rearward deck structures 32, 34 of the mattress support deck 14 and the front and rear linkage assemblies 84, 86 of the forward and rearward carriages 76, 78 independent of one another and relative to the main frame 12 to transform the bed 10 to the desired one of the different multiple positions. As an alternative to the use of electric motors, hydraulic or pneumatic actuating devices could be used.

Figure 4:
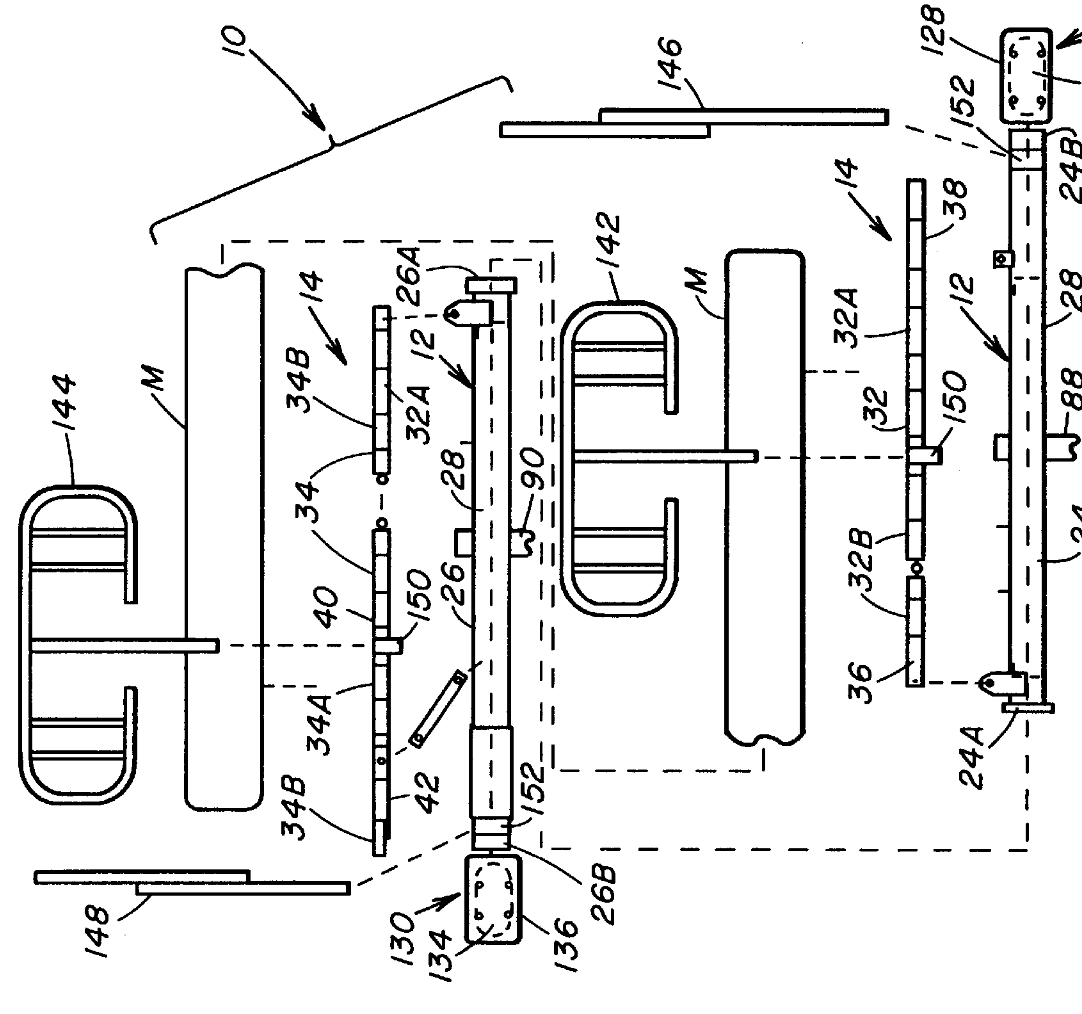
FIG. 4 is an exploded fragmentary side elevational view of the bed with the mattress and foot board, head board and side rail assemblies.

Referring to FIG. 4, the bed 10 also has front and rear half rails 142, 144 and head and foot board assemblies 146, 148 which mount to respective brackets 150, 152 on the support deck 14 and main frame 12 so as to substantially surround the mattress M resting on the support deck 14 above the main frame.

Referring to FIGS. 7–10, there is illustrated in detail a representative one 64 of the actuator devices 64, 66, 112, 114 employed by the bed 10 of the present invention. The actuator device comprises a separate feature of the present invention and can be used in an variety of other applications wherein a push/pull type force is needed to do work. As mentioned above, the actuator device 64 includes an elongated hollow tube 68 and an elongated threaded screw shaft 70 rotatably and threadably mounted through the elongated hollow tube 68 for undergoing rotation relative thereto and thereby extension from and retraction into the tube 68, depending upon the direction of rotation of the screw shaft 70.

Figure 10:
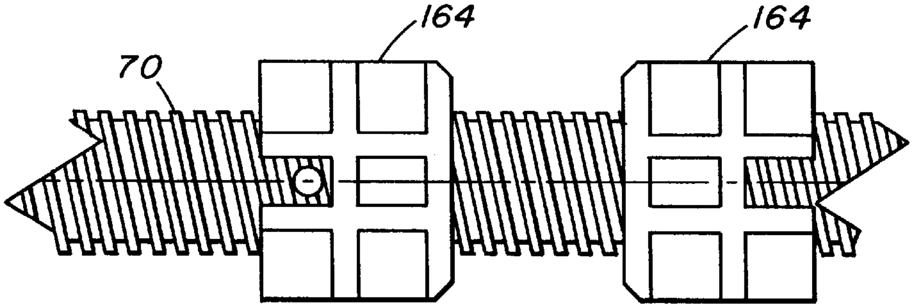
FIG. 10 is an enlarged fragmentary detailed view of the portion of the actuator device within circle 10 of FIG. 7.

The actuator device 64 also includes an annular collar 154 fitted into and positioned at one end of the hollow tube 68. The annular collar 154 includes a central bore which is internally threaded so as to receive and threadably interfit with the externally threaded screw shaft 70 extending into the tube 68. The annular collar 154 is secured to the end of the tube 68 so as to not rotate relative thereto due to the rotation of the screw shaft 70. Such securement against rotation is brought about by a locking arrangement comprised by a plurality of recesses 156 defined in the exterior surface of the annular collar 154 circumferentially spaced from one another, a series of spaced slots 157 formed through the tube 68 in alignment with the recesses, and a plurality of lock segments 158 removably placed through the tube slots 157 into the recesses 156. The lock segments 158 have a respective cross-sectional width slightly greater than that of the recesses 156 so that the lock segments 158 will protrude slightly therefrom. A cylindrical sleeve 160 is provided which inserts over the end of the tube 68 and is held in place by removable snap rings 162. The sleeve 160 surrounds the annular collar 154 so as to frictionally engage with the protruding portions of the lock segments 158. In such manner, the annular collar 154 is fixed or held in a non-rotational relationship to the tube 68 such that rotation of the screw shaft 70 relative to the annular collar 154 will cause the tube 68 to linearly translate so as to extend from or retract over the screw shaft 70 depending upon the direction of rotation of the screw shaft. As seen in FIG. 10, the actuator device 64 also can include other annular collars 164 inserted over the screw shaft 70 which are attached to rotate with the screw shaft 70 and act as guides in the tube and as limit stops.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An actuator device for applying push and pull forces to perform work, said actuator device comprising:

(a) an elongated hollow tube;

(b) an elongated externally threaded screw shaft extending at least partially through said elongated hollow tube to undergo rotation relative thereto and thereby extension from and retraction into said tube depending upon the direction of rotation of said screw shaft;

(c) an annular collar fitted into and positioned adjacent to one end of said hollow tube, said annular collar having a central bore internally threaded so as to receive and threadably interfit with said externally threaded screw shaft extending into said tube;

(d) a lock arrangement comprising a plurality of recesses defined in an exterior surface of said annular collar, a series of spaced slots defined through said tube in alignment with said recesses and a plurality of lock segments disposed through said slots and into said recesses, said lock segments having widths which cause them to protrude slightly from said recesses and through said slots; and (e) a sleeve inserted over said tube and surrounding said lock arrangement so as to interfit therewith in an engaged relationship which holds said annular collar against undergoing rotation with said screw shaft relative to said tube such that said tube linearly translates so as to extend from or retract over said screw shaft depending upon direction of rotation of said screw shaft.

2. The actuator device of claim 1 wherein said recesses are circumferentially spaced from one another about said annular collar.

3. The actuator device of claim 1 wherein said sleeve is held in place by snap rings removably engaged with said tube at opposite ends of said sleeve.

* * * * *